Patented Oct. 21, 1952

2,614,995

UNITED STATES PATENT OFFICE 2,614,995

SILICA SOLS AND PREPARATION THEREOF FROM METALLIC SILICON

Joseph H. Balthis, Mendenhall, Pa., assignor to E. I. du Pont de Nemours and Company, Wilmington, Del., a corporation of Delaware No Drawing. Application June 13, 1951, Serial No. 231,443

11 Claims. (Cl. 252—313)

This invention relates to silica sols and to a method of preparing same and, more particularly, to the preparation of aqueous colloidal solutions of silica wherein the silica particles differ from those heretofore known. This application is a continuation-in-part of applicant's copending application Serial No. 95,369, filed May 25, 1949, and entitled "Preparation of Silica Sols," now abandoned.

Aqueous silica sols are of considerable technical importance, for example in the treatment of hosiery to impart snag resistance, as fillers for white rubber, non-skid adjuvants to waxes, textile sizing and finishing agents, ingredients in emulsifying agents and in many other applications. These sols have generally been prepared from sodium silicate by treatment with acids or ion-exchange resins. No method to prepare silica sols directly from silicon has heretofore been known. Furthermore, the silica sols heretofore prepared have been characterized by having silica particles which are relatively dense and which exhibit relatively low reactivity in alkaline medium toward depolymerization, characteristics which are not advantageous in certain fields of use.

This invention has as an object a new method for preparing silica sols. A further object is a method by means of which silica sols are easily and economically obtained from metallic silicon. A still further object is a method for preparing silica sols which is convenient in practice and which yields silica sols of high concentration and of controllable particle size. In addition, the invention has as an object the provision of a new aqueous colloidal solution of silica and of new silica particles which are highly porous and exhibit outstanding activity toward depolymerization in alkaline medium, thus permitting formation of salts by reaction at room temperature with strong organic bases. Other objects will appear hereinafter.

The above objects are accomplished by reacting finely-divided silicon metal with water which contains at least 1% by weight of ammonia and which is present in amount providing at least 0.1 gram-mol of ammonia per gram atom of silicon. Hydrogen is evolved during the reaction and the metallic silicon is converted to a stable colloidal solution of silicon dioxide.

The purity or reactivity of the silicon has an influence on the reaction. Commercial silicon of ordinary grade reacts, if it is finely divided shortly before use, but it does so only at a slow rate. Silicon of very high purity is more satisfactory from this standpoint since it usually reacts at a much faster rate, but silicon of high purity is very expensive to use. However, silicon of any grade reacts at a satisfactory rate if it is first subjected to certain treatments which renders the metal more reactive, presumably by removal of a film of silicon dioxide from the particles. The pre-activation treatment may be carried out, for example, by washing the metal (preferably in a finely-divided form) with aqueous hydrofluoric acid, the latter being suitably at concentrations between 1% and 48%, or with aqueous solutions of ammonium bifluoride; or by carrying out the reaction with ammonia in a vented ball mill wherein the metal is subjected to continuous grinding; or, less effectively, by grinding the metal, mechanically or otherwise, just prior to use in the reaction; or by a combination of these methods. It is preferred that the silicon metal be reduced to a small particle size, e. g., between 80 and 320 mesh or finer. Larger particles will react, but more slowly. Freshly ground silicon is more reactive when prepared from relatively large particles, e. g., particles the size of a pea or a marble, than from coarse powders, probably because there is less initial superficial silica. In addition to elementary silicon, it is possible to use certain silicon alloys such as ferrosilicon containing 90% or more silicon.

The maximum concentration of ammonia in the aqueous ammonia reacted with the finely divided silicon is not material except from the standpoint of particle size of the silica in the resulting sol. Water containing 28% of ammonia (the commercial ammonium hydroxide), or much more if desired, e. g., 35%, may be used but there is no technical advantage in using high concentrations. In fact, it is often preferable to use as low concentrations of ammonia as is consistent with good reaction rate, for the reason that the particle size of the silica in the sols decreases with decreasing concentration of ammonia, and sols of low particle size are often preferable for many technical applications. The preferred range of ammonia concentration in the aqueous system lies between 1% and 10%. Likewise, the ratio gram-mols of ammonia/gram atoms of silicon may vary between about 0.1 and 30 or even more, but it is preferably between 0.5 and 6. Some reaction (conversion of silicon to silica) can be observed at somewhat lower ammonia concentrations or ratios than those specified, but the reaction is then so slow and incomplete that it is unpracticable.

The reaction temperature is not critical, as the reaction proceeds even at temperatures as low as 0° C. However, the rate of reaction increases with increasing temperature, and it is preferred to operate at temperatures between 20° C. and 90° C. Higher temperatures, e. g., 100° C.–150° C., can be used but there is in general no advantage in doing so because of unnecessary loss of ammonia. It is, of course, possible to operate at elevated temperatures, e. g., up to 200° C. or higher, with the use of pressure equipment.

Agitation during the reaction is not essential but it is desirable, as the rate and extent of reaction are increased thereby. Agitation can be combined with grinding, as when the reaction is carried out in a ball mill.

The progress of the reaction can be followed by the gradual disappearance of the metallic silicon and the rate of evolution of hydrogen. In general, an induction period is observed, after which the reaction starts and increases in rate, then becomes slower, possibly because a film of silica is deposited on the unreacted silicon. Thus, it is often advantageous to interrupt the process when one-third to two-thirds of the silicon has reacted and to recover the unreacted metal by filtration or centrifugation. It can then, if desired, be reactivated, for example by washing with aqueous hydrofluoric acid. Depending on conditions such as temperature and state of activation of the metal, substantial conversion to silica usually occurs within 4 to 48 hours from the start of the reaction, or much more rapid reaction can be achieved by operating in a ball mill. It is in general desirable to carry out the reaction until at least 10% of the silicon has been converted to silica. Continuous or semi-continuous operation is possible by withdrawing the sol continuously and adding ammonia as required.

The silica sols produced by the process of this invention show very good uniformity of particle size when examined under the electron microscope. The particle size obtained with 1–5% ammonia solution is in the very low range of 8 to 15 millimicrons (80–150 angstrom units), as measured by light scattering technique. Such a fine particle size is not ordinarily obtainable by the methods heretofore known for preparing silica sols. In general, the particle size will not exceed about 35 millimicrons when the silica sols are made according to this invention. Moreover, the sols of this invention are highly stable. They can be concentrated without difficulty merely by boiling off part of the water and the excess ammonia. Thus, it is possible to obtain sols having solids contents as high as 40–50%. Sols containing as much as 25–35% solids and even more are extremely stable and show no tendency to gel upon prolonged storage. In addition, the silica particles are highly porous and exhibit outstanding activity toward depolymerization in alkaline medium.

The invention is illustrated in greater detail in the following examples wherein all proportions are by weight unless otherwise stated:

Example I

The silicon used in the experiment was a substantially chemically pure material containing only traces of magnesium and copper by spectrographic examination. It had a conductivity of 0.01–1 reciprocal ohm/centimeter, as compared with a value of 15–30 for the best commercial products.

This material was ground to a fine powder and 1.058 parts of the freshly ground metal was placed in a vessel with 45 parts of commercial aqueous ammonia containing 26–28% $NH_3$ by weight, the reaction mixture being maintained without agitation at 20–25° C. Strong effervescence commenced almost immediately. The liberated gas was hydrogen containing some entrained ammonia. After 21 hours the reaction mixture was filtered. From the weight of the unreacted metal it was calculated that 27.7% of the silicon had been converted to silica, which was present in the filtrate as a colloidal sol at a concentration of 0.018 g./cc., as determined by evaporation of weighed samples.

Example II

The same silicon as that described above was used. Two parts of freshly pulverized metal was reacted with 90 parts of aqueous ammonia containing 26–28% $NH_3$ at 20–25° C. for 150 hours, the reaction mixture being mechanically agitated for about two-thirds of this time. From the weight of the unreacted metal it was calculated that the reaction had proceeded to the extent of 69.3%. Titration of samples of the reaction mixture at intervals showed that the ammonia concentration decreased from 13.95 N to 10.43 N during 150 hours. A control containing no silicon showed practically the same loss of ammonia, from 13.95 N to 10.94 N, which indicates that the loss of ammonia in the conversion of silicon to silica sol is accounted for by normal evaporation and entrainment with the hydrogen evolved.

Example III

The pure silicon described above was used. A mixture of 6 parts of freshly pulverized metal and 180 parts of aqueous ammonia (26–28% $NH_3$ by weight) was reacted for 24 hours at 120° C. in a sealed vessel at the autogenous pressure of the aqueous solution. From the weight of the unreacted silicon it was calculated that the reaction had proceeded to the extent of 47.4%. There was obtained an aqueous silica sol containing 0.052 g. of silica per cc. Electron photomicrographs showed that the particles were remarkably uniform in size.

When the above sol was concentrated by boiling to one-fifth of its volume, the remaining concentrated sol was completely stable on several weeks' storage. The sol had a pH of about 5 when concentrated to half its original volume.

Example IV

A sample of ordinary commercial silicon was ground to a fine powder, washed thoroughly with 48% aqueous hydrofluoric acid and rinsed with water. When this washed silicon was treated with 28% aqueous ammonia at 20–25° C., reaction started immediately with evolution of hydrogen and formation of a silica sol. After 7 hours the amount of hydrogen evolved indicated that the conversion was about 36% complete. When another sample of the same silicon, ground but not washed with hydrofluoric acid, was treated with 28% ammonia, the reaction was slower. It had proceeded only to the extent of about 6% after 7 hours.

The effects of the concentration of ammonia on the reaction and product are shown below in tabular form. All of the tabulated runs were carried out with silicon metal of the quality described in Example I, which, to insure maximum activity, was activated by stirring with 48% hydrofluoric acid, filtering, washing in turn with water, alcohol and ether and finally drying in an atmosphere of nitrogen. In each case, 100 parts by weight of aqueous ammonia of the designated strength was added to 2 parts of the activated silicon. After five days at room temperature, the unreacted silicon was filtered off and the solids content of the silica sols was determined by evaporating small samples at 100° C. The particle size of the silica in the sols was determined by light scattering technique, using light of 5460 angstrom units wave length (546 millimicrons), and the weight average molecular weight was calculated from these data.

| Run | Ammonia Content | | Solids Content of Sols (g./100 cc.) | Diameter of Particles (Millimicrons) | Wt. Average Molecular Wt. |
|---|---|---|---|---|---|
| | Percent by Weight | Gram-mols per Gram atom of Si | | | |
| 1 | 28 | 23.0 | 2.95 | 32.6 | 22,000,000 |
| 2 | 14 | 11.5 | 3.26 | 28.7 | 15,000,000 |
| 3 | 7 | 5.77 | 3.49 | 21.8 | 6,650,000 |
| 4 | 5 | 4.12 | 3.66 | 14.4 | 1,900,000 |
| 5 | 3 | 2.47 | 3.63 | 8.0 | 322,000 |
| 6 | 1.7 | 1.409 | 3.30 | | |
| 7 | 1 | 0.82 | 2.70 | | |

It will be seen from the above table that the ammonia concentration, down to a value of about 1%, has relatively little effect on the reaction rate. It has, however, an important effect on the particle size of the silica in the sols.

*Example V*

Silicon which had been ground and passed through a 320 mesh screen was agitated with 20% aqueous ammonia bifluoride, filtered, and washed in turn with water, alcohol and ether and dried in a stream of nitrogen. Two parts of this silicon were added to 90 parts of 28% aqueous ammonia, and the mixture was allowed to stand for 12 days. Unreacted silicon was separated by filtration. The resulting sol had a solids content of 0.0064 g./cc., as compared with a solids content of 0.0022 g./cc. when the silicon was not previously treated with ammonia bifluoride.

*Example VI*

A sample of silicon of the same high degree of purity as described in Example I was finely ground and allowed to age for 4 months. Upon treatment with 28% aqueous ammonia at 20° C.–25° C. for 2–3 days, reaction took place to some extent but the final silica sol contained only 0.215 g. of solids per 100 cc. When another sample of the same silicon was finely ground just prior to use and treated under the same conditions, the silica sol contained 0.626 g. of solids per 100 cc. When a third sample of the same silicon was ground, washed with 48% hydrofluoric acid as described in Example IV and then treated under the same conditions, the silica sol contained 2.06 g. of solids per 100 cc.

The process described herein has the important advantage of permitting control of the particle size of the resulting silica sols, since the particle size is in a large measure proportional to the amount and concentration of ammonia employed. Moreover, in contrast with former methods of converting silicon to silica sols which involve the use of sodium silicate as an intermediate, the present process employs a volatile agent (ammonia) which apparently serves as a catalyst for the reaction of water with silicon and can readily be expelled from the reaction product. Removal of excess ammonia can be accomplished simply by boiling the silica sol, if desired under reduced pressure, or by passing a current of air or inert gas through the sol, thus leaving an aqueous system containing colloidal silica particles substantially free of extraneous ions. Such systems are highly advantageous for the preparation of silica gel for use in catalytic processes since they are free of sodium and other catalytically objectionable ions. If the presence of small amounts of extraneous material is not detrimental, the ammonia need not be removed, or only partly so; or it can be neutralized by addition of fixed acids, or of carbon dioxide or sulfur dioxide. It is sometimes desirable to add acids or non-volatile alkali to assist in controlling the molecular weight and particle size of the silica during concentration and aging.

As already indicated, the silica sols prepared by the process of this invention are strikingly different from those heretofore known, chiefly in that the silica particles are much more porous and possess such high activity toward depolymerization even in very dilute alkali at room temperature. This high activity toward depolymerization permits formation of salts by reaction at room temperature with strong organic bases and is especially valuable for reaction with thermally unstable organic bases. An advantage of the porous character of the silica particles is that they give dry powders of low density particularly adapted for use as fillers in rubber and plastics.

For the purpose of accurately characterizing the unique features of the aqueous colloidal solution of silica of the present invention, the following definitions of terms and tests are given:

*Colloidal solutions.*—A colloidal solution is one in which the solute particles are of colloidal dimensions, i. e., particles having an average diameter not exceeding about 100 millimicrons nor less than about 1 millimicron.

*Average diameter.*—The number average diameter, $d_n$, of particles can be directly observed by means of an electron microscope. The diameter of a large number of particles is measured, measurements being made only on those particles which are lying in such a way as to present more than a semicircle of cross-section. By counting and measuring a large number (several hundred) of particles which are lying in such a position as to present at least a semicircle of silhouette, the average particle diameter can be determined. In counting such particles, the latter are grouped according to diameter as measured in millimicrons; each group consists of particles lying within a 5 millimicron range, for example, 10 to 15 millimicrons, 15 to 20 millimicrons, etc. The number average particle diameter, $d_n$, is then calculated from the number of particles found in each of these groups, and may be expressed mathematically as follows:

$$d_n = \frac{\sum_{i=1}^{i=k} n_i d_i}{\sum_{i=1}^{i=k} n_i}$$

where $n_i$ is the number of particles in the $i$th range of sizes, the mean diameter of which is $d_i$, and $k$ is the number of size ranges.

*External specific surface area.*—This surface is the outer surface bounding the silica particles as calculated from electron micrographs. The same particle count is used as was described under "average particle diameter." The surface area of the particles within each group measured is calculated from the average diameter of the group and the number of particles within the group. The total surface area of all of the counted particles may then be calculated by summation of the areas in each group. The specific surface area is this total surface area, divided by the total mass of the particles counted, the latter being determined by summation. In carrying out this calculation, it is usual to calculate first a "surface area average diameter," $d_s$, which would be the diameter of a spherical particle which has the same specific surface area as that of the total collection of counted particles.

This may be expressed mathematically as follows:

$$d_s = q \frac{\sum_{i=1}^{i=k} n_i d_i^3}{\sum_{i=1}^{i=k} n_i d_i^2}$$

where the symbols have the same meaning as described above. The specific surface area, $S_c$, expressed as square meters per gram may then be calculated from $d_s$, measured in millimicrons, taking the density of silica as 2.2 grams per cc., which is the density of amorphous, anhydrous, non-porous silica, as follows:

$$S_c = \frac{6 \times 10^3}{\text{density} \times d_s} = \frac{2720}{d_s}$$

*Specific surface area by nitrogen adsorption.*—This is the area of the external surface plus that of the internal pore surface per gram of silica, as determined by nitrogen adsorption. The method used for measuring specific surface areas by low temperature nitrogen adsorption is described in "A new method for measuring surface areas of finely divided materials and for determining the size of particles" by P. H. Emmett in Symposium on New Methods for Particle Size Determination in the Sub-Sieve Range, p. 95, published by the American Society for Testing Materials, March 4, 1941. The value of $16.2 A^2$ for the area covered by one surface adsorbed nitrogen molecule is used in calculating the specific surface areas.

*Specific surface area by adsorption of methyl red dye.*—This test indicates the surface area per gram of silica which is available to the methyl red molecule. For this test, it is necessary that the sample be dried in a special manner—at least 4 hours at 110° C., in an air oven, but in no case at a higher temperature than 150° C. This special limitation on drying is necessary, since it is believed that methyl red is adsorbed only on a hydroxylated surface, that is, a surface covered with silanol groups. The methyl red adsorption test is carried out by agitating in 25 milliliters of an anhydrous benzene solution containing 0.6 to 0.7 gram of the acid form of methyl red, para-dimethylamino azobenzene orthocarboxylic acid, $(CH_3)_2NC_6H_4=NC_6H_4COOH$, per liter, a suspension of a few tenths of a gram of the dried silica sample to be tested. No more than about 0.7 gram of this sample should be used in the test. Appreciably less must be used with voluminous samples, to avoid getting a mixture too thick to handle. Within the latter limitations, however, the amount of sample used should provide as near as possible a total available hydroxylated surface area of 10 square meters in the test. The test mixture is agitated for about two hours at about 25° C., to reach equilibrium conditions; an equilibrium concentration of 400 milligrams of dye per liter insures saturation adsorption.

The decrease in dye concentration in the benzene solution is determined by adsorption spectrophotometric observations at 4750 A. of both the original and equilibrium benzene solutions of methyl red. The specific hydroxylated surface area in square meters per gram is calculated from the formula:

$$S_d = \frac{\text{grams dye adsorbed} \times 116 \times 10^{-20} \times \text{Avogadro's No.}}{\text{grams silica employed} \times \text{molecular weight of methyl red}}$$

where the covering power of each adsorbed methyl red molecule is approximately 1.16 square millimicrons.

This method apparently measures the external specific surface area, since the values obtained agree within ±25% with the external surfaces as measured by electron micrographs.

*Porosity.*—Porosity is indicated by the fact that the specific surface area by nitrogen adsorption is larger than that calculated from particle diameter measured in electron micrographs. The difference between these areas may be considered to be the area of the pores. These pores are apparently so small that they are not only not visible in electron micrographs, but are not appreciably penetrated by the methyl red dye.

*Specific depolymerization rate.*—This is a measure of the activity of the silica surface toward hydroxyl ions, and is measured by the rate of solution or depolymerization of the silica to monomeric form, divided by the specific surface area of the sample tested.

The depolymerization, or solution of polymeric silica in the presence of hydroxyl ions, results in the production of monomeric sodium silicate. The reaction of this monosilicate with acid molybdate reagent prepared from ammonium molybdate and sulfuric acid results in the formation of a yellow silicomolybdate complex, $$SiO_2 . 12MoO_3 . xH_2O$$

It has been demonstrated that the color intensity of this complex is proportional to the amount of monosilicic acid which has reacted with the molybdate reagent.

Harmon, J. Phys. Chem., 31, 616–25 (1937), has shown that this complex molybdic acid reacts with ionic or "crystalloidal" silica, but not with colloidal silica; thus, the use of excess alkali in the standard analytical procedure for the determination of silica by the molybdate color reaction is recommended in order to convert all of the silica to the soluble or crystalloidal form.

Not only does the molybdate reagent react rapidly with monomeric silicic acid, but the acid nature of the reagent practically arrests depolymerization of any high molecular weight colloidal silica present when an aliquot of the silica sample is mixed with the acid molybdate reagent. The reaction of this agent with monosilicic acid can therefore be used to determine the amount of monomer present in the depolymerizing solution at any given time.

The molybdate reagent is prepared as follows: A hundred grams of $(NH_4)_6Mo_7O_{24} . 4H_2O$ is dissolved in distilled water and is then diluted to 1 liter. Just prior to use, 40 milliliters of this reagent are added to 100 milliliters of 1 normal sulfuric acid and 860 milliliters of distilled water. This strength molybdate reagent provides a very convenient reading on the Beckman Model DU photoelectric quartz spectrophotometer (which is used to follow the color development), when mixed with enough silica sample to result in a maximum silica concentration of 1 milligram per 50 milliliters total in the color developing solution. For solutions of this maximum silica concentration, an optical density value of 0.720 is obtained.

The depolymerization of a silica sol is carried out at 30° C. in 0.01 normal sodium hydroxide solution. It is necessary, for this test, to use deionized silica sols. Therefore, the sols are first deionized by passage through a sulfonic type cation exchange resin, usually "Nalcite HCR" (a nuclear sulfonated polymer of styrene containing divinyl benzene and having an exchange capacity of 52.8 kilograins of $CaCO_3$ per cu. ft. of resin. Ion Exchange Theory and Application, F. C. Nachod, Academic Press, Inc., New York, 1949, p. 385, et seq.), followed by passage through a moderately, but not strongly basic anion exchange resin, such as "Amberlite IR4B" (a modified phenol formaldehyde polyamine condensate containing 14% nitrogen and 39.9% water in the basic form of the resin and having an exchange capacity of 10 milliequivalents per gram of resin. Keenin and Meyers, J. A. C. S., vol. 69, p. 2874 (1947)). After deionization, the silica sol is diluted to 0.2% silica with distilled water. Then 10 milliliters of this silica sol are pipetted into 90 milliliters of sodium hydroxide solution prepared from 80 milliliters of water and 10 milliliters of 0.1 normal sodium hydroxide, so as to result in 100 milliliters of 0.01 normal sodium hydroxide containing 0.02% silica at 30° C.

For measurement of silica powders, the procedure consists of acid washing with hot concentrated hydrochloric acid, followed by small successive portions of distilled water, followed by acetone washing and drying at 110° C. Twenty milligrams of the dried powder is accurately weighed and transferred to 100 milliliters of 0.01 normal sodium hydroxide solution maintained at 30° C. The slurry is agitated vigorously by bubbling with nitrogen gas saturated with water vapor at 30° C.

The procedure for the measurement of depolymerization rate is carried out as follows:

At appropriate intervals, determined by the rate of depolymerization reaction, usually between 5 and 90 minutes, five milliliter aliquots are withdrawn from the depolymerizing solution, and pipetted into a clean flask. Then 45 milliliters of the molybdate reagent which has been freshly prepared is added to the flask and the mixture thoroughly shaken. The time of mixing with the molybdate reagent is taken as the time at which depolymerization is arrested. The amount of monomer present at any time can then be calculated from the optical density reading as it is obtained on the Beckman spectrophotometer, provided the final color for complete depolymerization (100% monomer) is known.

The optical density of the solution measured at various time intervals at a wavelength of 400 millimicrons with a slit width of 0.03 millimeter, is used with the final color value to determine the percentage monomer present. In general, the extinction or optical density is measured two minutes after the initial mixing of silicic acid with molybdate reagent, and is followed for 1–2 minutes at half minute intervals until a constant color value is obtained. The reference solution for these measurements is the color developing reagent itself. If the silica sol is turbid, however, a blank composed of 5 milliliters of the sol and 45 milliliters of distilled water should also be run, and the values so obtained subtracted from the optical density for the sample, to obtain a corrected optical density for the total monomer concentration.

Six to eight monomer-time readings are taken during the time that approximately half of the sample is depolymerized. Total silica is analyzed in the same manner as described above, by heating the solution to 90° C.–100° C. until complete depolymerization of the sample has occurred, as is shown by the absence of variation between consecutive analyses.

From a knowledge of the time intervals at which the monomer concentrations were measured, and of the amount of silica present as monomer at these time intervals, a graph of the monomer concentration vs. time can be constructed. The per cent silica present as monomer is usually plotted as the ordinate, while the time in minutes is plotted as the abscissa. The slope of the line so obtained can then be used to calculate the rate of monomer formation per 100 minutes of time.

The specific depolymerization rate is defined as the rate of monomer formation per 100 minutes of time, divided by the specific surface area of the depolymerizing particles at the time of measurement of rate of monomer formation. Stated mathematically $$K=\frac{(dm/dt)_{100}\times 100}{A_n(1-m)^{2/3}}$$

where K is the specific depolymerization rate, $(dm/dt)_{100}$ is the rate of monomer formation per 100 minutes of time, $A_n$ is the original specific surface area of the silica tested, and $m$ is the fraction of total silica converted to monomer at the time, $t$. This rate is not necessarily a constant for a given silica sample, but may vary throughout the depolymerization of the sample.

The products of this invention have a high specific depolymerization rate in comparison with those of the prior art, as indicated in Example VII. It is believed that this high specific rate may be due to the presence of pores or imperfections in the silica structure which cannot be penetrated by nitrogen gas, but which are still accessible to the hydroxyl ions. However, a high specific depolymerization rate can also be explained by a less stable silicon-oxygen surface configuration. There may be other variations in the structure which would also contribute to the high specific rate.

*Ratio of specific surface area as determined by nitrogen adsorption to external specific surface area.*—The porosity is such that the ratio is at least 2, and ranges as high as 3, although it is probable that by variation in batch conditions, a ratio somewhat higher than this might be achieved.

The following examples wherein all proportions are by weight unless otherwise stated, illustrate specific embodiments of the invention wherein the products obtained are particularly characterized.

*Example VII*

Twenty grams of freshly ground silicon as described in Example I, were treated with 50 milliliters of 48% hydrofluoric acid in a wax-coated beaker by intermittent swirling for one hour. The product was filtered through filter paper in a wax-coated funnel and washed with water until the pH of the wash water rose to a constant value of 5.4. Water was removed from the wet silicon by acetone washing, the product then being dried in a nitrogen stream at 70° C. to 110° C. To two grams of this silicon, maintained in a nitrogen atmosphere, were added 75 milliliters of water and 25 milliliters of 28% aqueous ammonia, giving a solution containing 7% anhydrous ammonia. This mixture was stoppered loosely to permit escape of evolved hydrogen and kept at room temperature for 15 days with intermittent shaking, at the end of which time the sol containing 2.7% silica was decanted from unreacted silicon. Forty milliliters of this sol were deionized with "Nalcite HCR" resin to a pH of 4.9. The sol was then put over "Drierite" in a vacuum desiccator and evaporated until gelation occurred. The dry-appearing gel was washed thoroughly with acetone and dried in an air stream at 40° C.–50° C. The surface area by nitrogen adsorption made on this dried sample was 328 M²/g. The following information was obtained from an electron micrograph of the sol before drying: $d_s$=21.8 millimicrons; $d_n$=18.3 millimicrons; $S_c$=125 M²/g. The specific depolymerization rate was as follows:

| Percent Monomer | 20 | 50 | 70 |
|---|---|---|---|
| K | 155 | 213 | 300 |

In contrast to this very active sol prepared according to this invention, the following shows typical data from a material of the prior art. A sol was prepared by treating sodium silicate according to the procedure given in the co-pending application of Bechtold and Snyder, Serial No. 65,536, filed December 15, 1948, with a cation exchange resin to give a sol of 2% silica. This sol was then alkalized to give an $SiO_2/Na_2O$=90. A heel of this sol was evaporated, maintaining a constant volume by further addition of the same sol until at least 5 parts of silica were added for each part of silica in the heel sol and the concentration was built up to 30% silica. The following data was obtained on this: $d_s$=19.0 millimicrons, $d_n$=16.0 millimicrons, $S_c$=143 M²/g., and the surface area by nitrogen adsorption is 181 M²/g. The specific depolymerization rate is as follows:

| Percent Monomer | 10 | 20 | 30 |
|---|---|---|---|
| K | 5–6 | 8–9 | 9–10 |

Example VIII

The same treated silicon was used as in Example VII. It was slurried, however, in 100 milliliters of aqueous ammonia containing 3% anhydrous ammonia. The reaction was continued for 15 days, after which time the sol, containing 3.1% silica, was decanted from the unreacted silicon. An electron micrograph of this sol indicated $d_n$ to be approximately 10 millimicrons. The following specific depolymerization rates were found:

| Percent Monomer | 10 | 20 | 30 | 50 |
|---|---|---|---|---|
| K | 69 | 60 | 66 | 82 |

These K values were calculated, using $S_c$=273 M²/g.

Example IX

Two grams of freshly ground, untreated silicon as described in Example I, were treated at 20° C.–25° C. with 100 milliliters of an aqueous solution of ammonia containing 7% anhydrous ammonia, the loosely stoppered slurry being intermittently shaken for 15 days before decantation of the sol (2.4% silica). Ammonia was removed from 30 milliliters of this sol by bubbling with nitrogen until the pH dropped from 11.15 to approximately 7. The sol was gelled by addition of acetone and the gel was then washed free of water with acetone. The gel was then dried in air at 50° C. The specific surface area by nitrogen adsorption of this sample was 288 M²/g. The specific depolymerization rate was as follows:

| Percent Monomer | 20 | 30 | 50 | 60 |
|---|---|---|---|---|
| K | 153 | 176 | 243 | 286 |

Example X

A sample of the silica sol of run 3 in Example IV, containing 3.49% silica, was treated, after aging two years, as follows: The pH of the sol was reduced to 4 by addition of sulfuric acid, causing precipitation of the silica to occur. The silica was filtered and washed with hot concentrated hydrochloric acid and then water-washed to a pH of approximately 2. Water was then removed by acetone washing and the product dried at 120° C. for one hour. The specific surface area by nitrogen adsorption was found to be 315 M²/g. The following data were obtained from electron micrographs of the sol: $d_s$=24.0 millimocrons, $d_n$=20.0 millimicrons, $S_c$=115 M²/g.; $S_d$ (on the dried sample) =106 M²/g. The specific depolymerization rate on the aged sol was found as follows:

ON THE SOL

| Percent Monomer | 10 | 20 | 30 | 40 |
|---|---|---|---|---|
| K | 15 | 12.5 | 42 | 38 |

ON THE SAMPLE DRIED FROM ACETONE

| Percent Monomer | 10 | 20 | 30 | 40 |
|---|---|---|---|---|
| K | 27 | 29 | 36 | 51 |

It will be understood that the above examples are merely illustrative and that the products of this invention are an aqueous colloidal solution of silica comprising discrete spheroidal amorphous particles of silica having an average diameter of from 8 to 35 millimicrons and a silica powder comprising such particles of silica, the particles of silica being further characterized by such porosity that the specific surface area as measured by nitrogen adsorption is at least twice the specific surface area as calculated from the surface area average particles diameter determined from electron micrographs.

The particles of silica of this invention are also characterized by having a specific surface area as determined by nitrogen adsorption which is at least twice the specific surface area as determined by the adsorption of methyl red dye. These particles of silica are also strikingly characterized by having specific depolymerization rates greater than 20 at the point where 30% of the silica has been depolymerized to monomer.

It will be apparent that the aqueous colloidal solution of silica of the present invention comprises silica particles markedly more porous and having much higher specific depolymerization rates than the silica particles of the heretofore known colloidal solutions of silica prepared by the reaction of acid with sodium silicate. The present colloidal solution of silica is distinctly new and so different from the prior silica sols as to be well adapted for uses either closed to the prior silica sols or for which the prior silica sols were so poorly adapted that they were not practically feasible.

As many apparently widely different embodiments of this invention may be made without departing from the spirit and scope thereof, it is to be understood that the invention is not limited to the specific embodiments thereof except as defined in the appended claims.

The invention claimed is:

1. A process for obtaining aqueous silica sols which comprises contacting finely-divided silicon metal with water which contains from about 1% to 35% by weight of ammonia and which is present in amount providing at least 0.1 gram-mol of ammonia per gram atom of silicon, and continuing the reaction at a temperature of 0° C. to 200° C. until a colloidal solution of silicon dioxide in the aqueous reaction medium is obtained.

2. The process set forth in claim 1 in which the concentration of the ammonia in the water is from 1% to 10% and in which the ratio gram-mols of ammonia/gram atoms of silicon is from 0.1 to 6.

3. A process for obtaining aqueous silica sols which comprises contacting, at a temperature of from 20° C. to 90° C. finely-divided silicon metal with water which contains from about 1% to 35% by weight of ammonia and which is present in amount providing at least 0.1 gram-mol of ammonia per gram atom of silicon, and continuing the reaction until a colloidal solution of silicon dioxide in the aqueous reaction medium is obtained.

4. The process set forth in claim 3 in which the concentration of the ammonia in the water is from 1% to 10% and in which the ratio gram-mols of ammonia/gram atoms of silicon is from 0.1 to 6.

5. A process for obtaining aqueous silica sols which comprises washing finely-divided silicon metal with aqueous hydrofluoric acid, and then contacting the finely-divided silicon metal thus treated with water which contains from about 1% to 35% by weight of ammonia and which is present in amount providing at least 0.1 gram-mol of ammonia per gram atom of silicon, and continuing the reaction at a temperature of 0° C. to 200° C. until a colloidal solution of silicon dioxide in the aqueous reaction medium is obtained.

6. An aqueous colloidal solution of silica comprising discrete spheroidal amorphous particles having an average diameter of from 8 to 35 millimicrons, the particles containing pores having a surface area at least equal to the external surface area of the particles as calculated from the surface area average particle diameter determined from electron micrographs.

7. An aqueous colloidal solution of silica comprising discrete spheroidal amorphous particles having an average diameter from 8 to 35 millimicrons, the particles containing pores having a surface area at least equal to the external surface area of the particles as determined by the adsorption of methyl red dye.

8. An aqueous colloidal solution of silica comprising discrete spheroidal amorphous particles having an average diameter of from 8 to 35 millimicrons, the particles being further characterized by having a specific depolymerization rate greater than 20 at the point where 30% of the silica has been depolymerized to monomer, the specific depolymerization rate being calculated from the expression:

$$\text{Rate} = \frac{(dm/dt)_{100} \times 100}{A_n(1-m)^{2/3}}$$

where $(dm/dt)_{100}$ is the rate of silicic acid monomer formation per hundred minutes, $A_n$ is the original specific surface area of the silica, and $m$ is the fraction of total silica converted to monomer at 30° C. in 0.01 normal sodium hydroxide solution at the time, $t$.

9. A silica powder comprising amorphous particles having an average diameter of from 8 to 35 millimicrons, the particles containing pores having a surface area at least equal to the external surface area of the particles as calculated from surface area average particle diameter determined from electron micrographs.

10. A silica powder comprising amorphous particles having an average diameter from 8 to 35 millimicrons, the particles containing pores having a surface area at least equal to the external surface area of the particles as determined by the adsorption of methyl red dye.

11. A silica powder comprising amorphous particles having an average diameter of from 8 to 35 millimicrons, the particles being further characterized by having a specific depolymerization rate greater than 20 at the point where 30% of the silica has been depolymerized to monomer, the specific depolymerization rate being calculated from the expression:

$$\text{Rate} = \frac{(dm/dt)_{100} \times 100}{A_n(1-m)^{2/3}}$$

where $(dm/dt)_{100}$ is the rate of silicic acid monomer formation per hundred minutes, $A_n$ is the original specific surface area of the silica, and $m$ is the fraction of total silica converted to monomer at 30° C. in 0.01 normal sodium hydroxide solution at the time, $t$.

JOSEPH H. BALTHIS.

REFERENCES CITED

The following references are of record in the file of this patent:

UNITED STATES PATENTS

| Number | Name | Date |
| --- | --- | --- |
| 1,835,420 | Neundlinger | Dec. 8, 1931 |
| 1,959,748 | Svendson | May 22, 1934 |
| 1,959,749 | Svendson | May 22, 1934 |

OTHER REFERENCES

Rochow, E. C.: "Chemistry of Silicones," 1946, John Wiley & Sons Inc., New York, p. 3.